(12) United States Patent
Seo et al.

(10) Patent No.: US 9,406,925 B2
(45) Date of Patent: Aug. 2, 2016

(54) RECHARGEABLE BATTERY

(71) Applicant: SAMSUNG SDI CO., LTD., Yongin-si, Gyeonggi-do (KR)

(72) Inventors: Yong-Chul Seo, Yongin-si (KR); Min-Hyung Guen, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/617,256

(22) Filed: Feb. 9, 2015

(65) Prior Publication Data

US 2015/0263330 A1 Sep. 17, 2015

(30) Foreign Application Priority Data

Mar. 11, 2014 (KR) ........................ 10-2014-0028468

(51) Int. Cl.
*H01M 8/04* (2006.01)
*H01M 2/34* (2006.01)
*H01M 2/04* (2006.01)

(52) U.S. Cl.
CPC ............ *H01M 2/345* (2013.01); *H01M 2/0473* (2013.01); *H01M 2200/20* (2013.01); *H01M 2220/30* (2013.01)

(58) Field of Classification Search
CPC ..................... H01M 2200/20; H01M 2220/30; H01M 2/345; H01M 2/043; H01M 2/0473
See application file for complete search history.

(56) References Cited

U.S. PATENT DOCUMENTS

| 7,781,088 | B2 | 8/2010 | Yamaguchi et al. | |
| 2012/0214050 | A1 | 8/2012 | Kim | |
| 2013/0295420 | A1* | 11/2013 | Guen | H01M 2/22 429/61 |

FOREIGN PATENT DOCUMENTS

| JP | 2012-230905 A | 11/2012 |
| KR | 10-2012-0096157 A | 8/2012 |

* cited by examiner

*Primary Examiner* — Patrick Ryan
*Assistant Examiner* — Ben Lewis
(74) *Attorney, Agent, or Firm* — Lee & Morse, P.C.

(57) ABSTRACT

A rechargeable battery including a case including an electrode assembly therein; a cap plate on the case, the cap plate including a short-circuit hole therein; an internal insulator at an inner side of the cap plate, the internal insulator covering the short-circuit hole; first and second electrode terminals that penetrate through the internal insulator and the cap plate and that are electrically connected to the electrode assembly; an external short-circuit part on the cap plate, the external short-circuit part including a membrane electrically connected to the short-circuit hole of the cap plate, the cap plate being electrically connected to the second electrode terminal, and a short-circuit tab electrically connected to the first electrode terminal, the external short-circuit part selectively spacing or short-circuiting the first electrode terminal and the second electrode terminal; and a retainer coupled with the internal insulator, the retainer being between the internal insulator and the electrode assembly.

11 Claims, 8 Drawing Sheets

RECHARGEABLE BATTERY

CROSS-REFERENCE TO RELATED APPLICATION

Korean Patent Application No. 10-2014-0029468, filed on Mar. 11, 2014, in the Korean Intellectual Property Office, and entitled: "Rechargeable Battery," is incorporated by reference herein in its entirety.

BACKGROUND

1. Field

Embodiments relate to a rechargeable battery

2. Description of the Related Art

A rechargeable battery is a battery that may be repeatedly charged and discharged, unlike a primary battery. A small capacity rechargeable battery may be used in a portable small electronic device such as a mobile phone, a laptop computer, or a camcorder, and a large capacity rechargeable battery may be used as a power supply for driving a motor of a hybrid vehicle, or the like.

Information disclosed herein is for enhancement of understanding of the background of the described technology and may contain information that does not form the prior art that is already known in this country to a person of ordinary skill in the art.

SUMMARY

Embodiments are directed to a rechargeable battery.

The embodiments may be realized by providing a rechargeable battery including a case including an electrode assembly therein; a cap plate on the case, the cap plate including a short-circuit hole therein; an internal insulator at an inner side of the cap plate, the internal insulator covering the short-circuit hole; first and second electrode terminals that penetrate through the internal insulator and the cap plate and that are electrically connected to the electrode assembly; an external short-circuit part on the cap plate, the external short-circuit part including a membrane electrically connected to the short-circuit hole of the cap plate, the cap plate being electrically connected to the second electrode terminal, and a short-circuit tab electrically connected to the first electrode terminal, the external short-circuit part selectively spacing or short-circuiting the first electrode terminal and the second electrode terminal; and a retainer coupled with the internal insulator, the retainer being between the internal insulator and the electrode assembly.

The internal insulator may include a through-hole underlying the short-circuit hole, and the retainer may include a portion that is spaced apart from the internal insulator in a first direction and that shields the through-hole.

The internal insulator may include a concave groove part facing the short-circuit hole, and the concave groove part may extend across an entire width of the internal insulator in a second direction intersecting with the first direction.

The through-hole of the internal insulator may be in the concave groove part facing the short-circuit hole.

The internal insulator may include catching jaws on side surfaces thereof, and the retainer may include a plate part that blocks the through-hole, and hooks at sides of the plate part, the hooks being coupled with the catching jaws.

The retainer may include an accommodating groove including an opening that is open in the second direction, the accommodating groove accommodating a lead tab therein, the lead tab connecting the first electrode terminal and the electrode assembly to each other.

The retainer may include an outlet that connects an internal insulator side of the retainer and an electrode assembly side of the retainer, the outlet discharging any electrolyte introduced into the external short-circuit part.

The retainer may include the plate part blocking the through-hole, and hooks on a region of the plate part that faces the through-hole of the internal insulator, the hooks being coupled with the through-hole.

The retainer may include a plate part blocking the through-hole, and elastic protrusions at sides of the plate part, the elastic protrusions being elastically coupled with side surfaces of the internal insulator.

The internal insulator may include a coupling protrusion that protrudes toward the electrode assembly, and the retainer may include a coupling hole coupled with the coupling protrusion.

The retainer may further include a corresponding through-hole closely coupled to the internal insulator and connected to the through-hole.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 1:
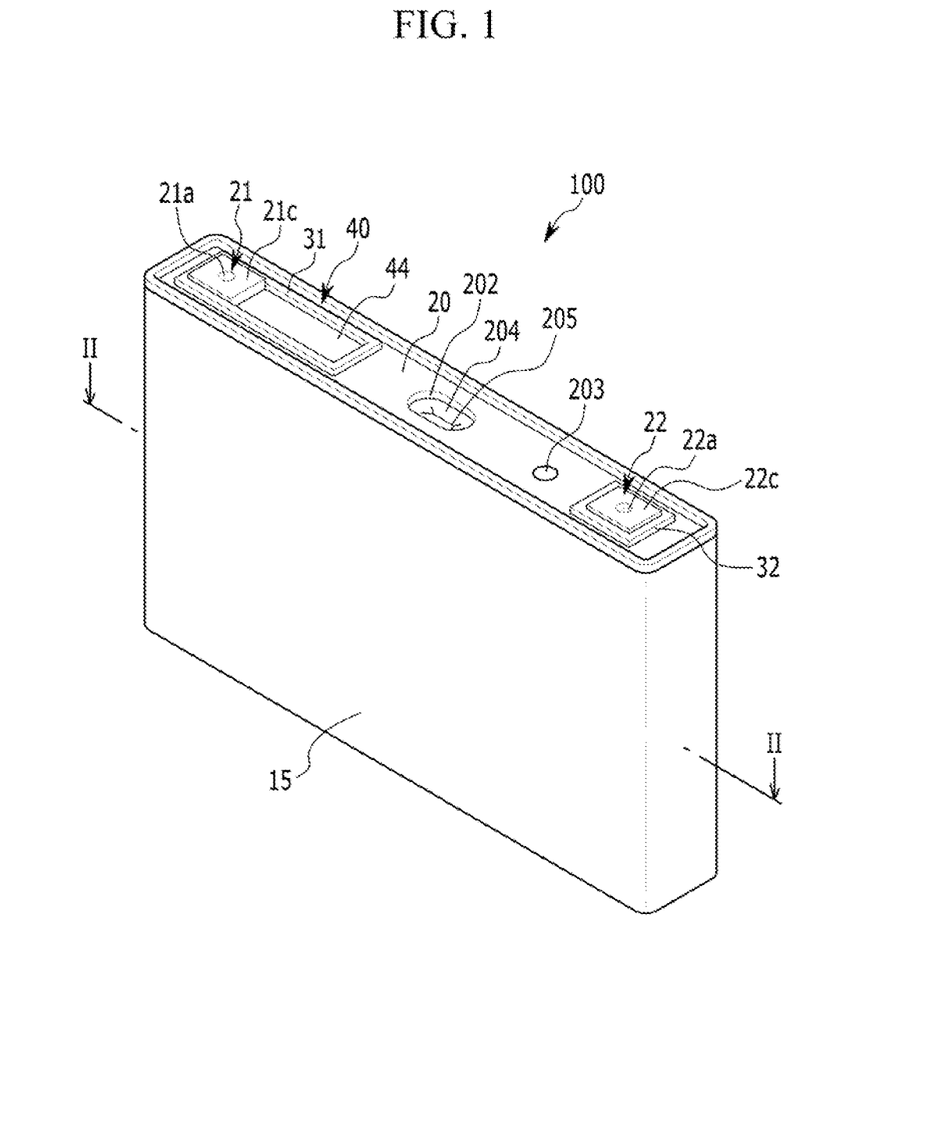
FIG. 1 illustrates a perspective view of a rechargeable battery according to an embodiment.
Figure 2:
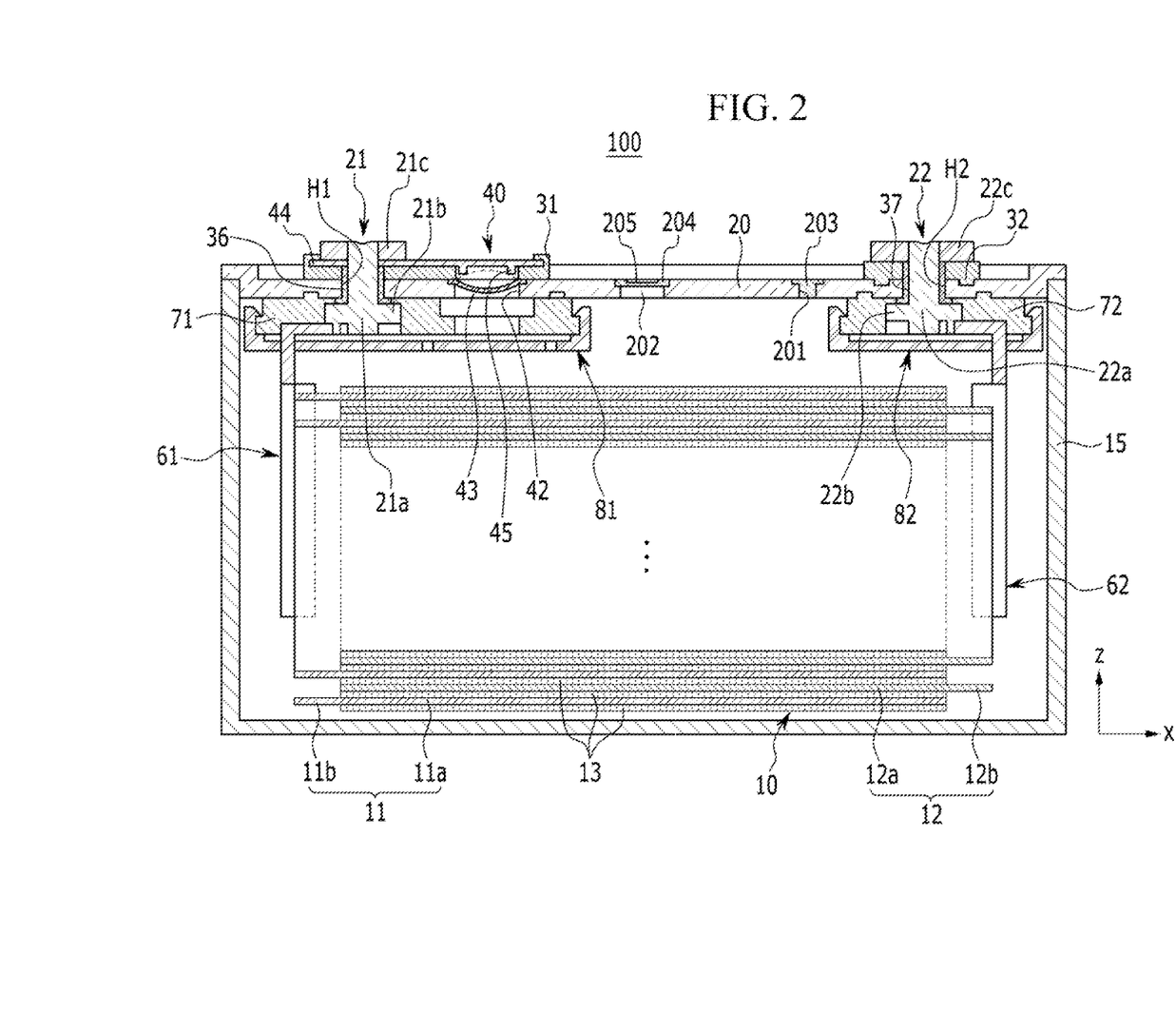
FIG. 2 illustrates a cross-sectional view taken along line II-II of FIG. 1.

FIG. 1 illustrates a perspective view of a rechargeable battery according to an embodiment and FIG. 2 illustrates a cross-sectional view taken along line II-II of FIG. 1. Referring to FIGS. 1 and 2, a rechargeable battery 100 according to an embodiment may include an electrode assembly 10 (performing charging and discharging operations), a case 15 (accommodating the electrode assembly 10 and an electrolyte therein), and a cap plate 20 (on and closing an opening of the case 15).

The rechargeable battery 100 may further include internal insulators 71 and 72 (at an inner side of the cap plate 20), a first electrode terminal 21 and a second electrode terminal 22 (penetrating through the cap plate 20 and the internal insulators 71 and 72 and in terminal holes H1 and H2 of the cap plate 20), an external short-circuit part 40 (that electrically connects or disconnects the cap plate 20 and the first electrode terminal 21), and retainers 81 and 82 (coupled with the internal insulators 71 and 72).

For example, the first electrode terminal 21 may be connected to a negative electrode of the electrode assembly 10 to be operated as a negative electrode terminal, and the second electrode terminal 22 may be connected to a positive electrode of the electrode assembly 10 to be operated as a positive electrode terminal. In an implementation, the external short-circuit part 40 may be electrically connected to the negative electrode terminal 21, and the cap plate 20 may be electrically connected to the positive electrode terminal 22.

The electrode assembly 10 may be formed by disposing a negative electrode 11 and a positive electrode 12 on surfaces, e.g., both surfaces, of a separator 13, e.g., an insulator, and winding the negative electrode 11, the separator 13, and the positive electrode 12 in a jelly roll state.

The negative electrode 11 and the positive electrode 12 may include coated parts 11a and 12a (in which a current collector formed of a metal foil is applied with an active material) and uncoated parts 11b and 12b (formed of a current collector that is not applied with the active material to thereby be exposed). In an implementation, the current collector of the negative electrode 11 may be formed of copper (Cu) and the current collector of the positive electrode 12 may be formed of aluminum (A1).

The uncoated part 11b of the negative electrode 11 may be at one end portion of the negative electrode 11 along the wound negative electrode 11. The uncoated part 12b of the positive electrode 12 may be at one end portion of the positive electrode 12 along the wound positive electrode 12. For example, the uncoated parts 11b and 12b of the negative and positive electrodes 11 and 12 may be at both ends of the electrode assembly 10, respectively.

In an implementation, the case 15 may be formed in a shape of an approximately rectangular parallelepiped (so that a space for accommodating the electrode assembly 10 and the electrolyte may be formed), and may include an opening at one side of the rectangular parallelepiped in order to connect the outside and an internal space to each other. The opening may facilitate insertion of the electrode assembly 10 into the case 15.

The cap plate 20 may be formed of or as a thin metal plate and may be welded to the opening of the case 15 to close the case 15. For example, the cap plate 20 and the case 15 may both be formed of or include aluminum to help increase mutual welding performance. In an implementation, the cap plate 20 may further include an electrolyte injection hole 201, a vent hole 202, and a short-circuit hole 42.

The electrolyte injection hole 201 may facilitate injection of an electrolyte into the case 15 after the cap plate 20 is coupled and welded to the case 15. After the electrolyte is injected, the electrolyte injection hole 201 may be sealed by a sealing closure 203.

The vent hole 202 may be closed by a vent plate 204 so as to be configured to discharge internal pressure of the rechargeable battery 100. When the internal pressure of the rechargeable battery 100 arrives at a predetermined pressure, the vent plate 204 may be cut or ruptured, such that the vent hole 202 is opened. The vent plate 204 may be a notch 205 formed therein in order to facilitate the cutting or rupturing.

In an implementation, the negative and positive electrode terminals 21 and 22 may penetrate through the cap plate 20, may be electrically connected to the electrode assembly 10, and may draw out the electrode assembly 10 to the outside of the case 15.

The negative and positive electrode terminals 21 and 22 may include rivet terminals 21a and 22a (each installed in the terminal holes H1 and H2 of the cap plate 20), flanges 21b and 22b (each widely formed integrally with the rivet terminals 21a and 22a at an inner side of the cap plate 20), and plate terminals 21c and 22c (at an outer side of the cap plate 20 and each connected to the rivet terminals 21a and 22a by riveting or welding).

Negative and positive electrode gaskets 36 and 37 may be inserted between the rivet terminals 21a and 22a of the negative and positive electrode terminals 21 and 22 and inner surfaces of the terminal holes H1 and H2 of the cap plate 20, respectively, to seal between the rivet terminals 21a and 22a of the negative and positive electrode terminals 21 and 22 and the cap plate 20. The negative and positive electrode gaskets 36 and 37 may be further extended and installed between the flanges 21b and 22b and an inner surface of the cap plate 20, respectively, to further seal between the flanges 21b and 22b and the cap plate 20.

Negative and positive electrode lead tabs 61 and 62 may electrically connect the negative and positive electrode terminals 21 and 22 to the uncoated parts 11b and 12b of the negative and positive electrodes 11 and 12 of the electrode assembly 10, respectively. For example, the negative and positive electrode lead tabs 61 and 62 may be coupled to lower ends of the rivet terminals 21a and 22a, respectively, and the lower ends may be caulked, such that the negative and positive electrode lead tabs 61 and 62 may be connected as a conduction structure to the lower ends of the rivet terminals 21a and 22a, respectively, while being supported by the flanges 21b and 22b, respectively.

The positive electrode gasket 37 may be further extended and inserted between the rivet terminal 22a of the positive electrode terminal 22 and a top plate 32 to help prevent the rivet terminal 22a and the top plate 32 from being electrically connected directly to each other. For example, the rivet terminal 22a may be electrically connected to the top plate 32 only through the plate terminal 22c. Therefore, the top plate 32, the cap plate 20, and the case 15 may be electrically connected to the positive electrode terminal 22 to thereby be electrified with the positive electrode. For example, the top plate 32, the cap plate 20, and the case 15 may be electrically connected to the positive electrode terminal 22 and thus may have the same polarity as the positive electrode.

The negative electrode gasket 36 may be further extended and inserted between the rivet terminal 21a of the negative electrode terminal 21 and the external short-circuit part 40 (e.g., between the rivet terminal 21a and a penetration hole of an external insulator 31 corresponding to the terminal hole H1). The external short-circuit part 40 may be configured so as to be maintained in a spaced-apart state or to be short-circuited, depending on the internal pressure of the rechargeable battery 100.

Figure 3:
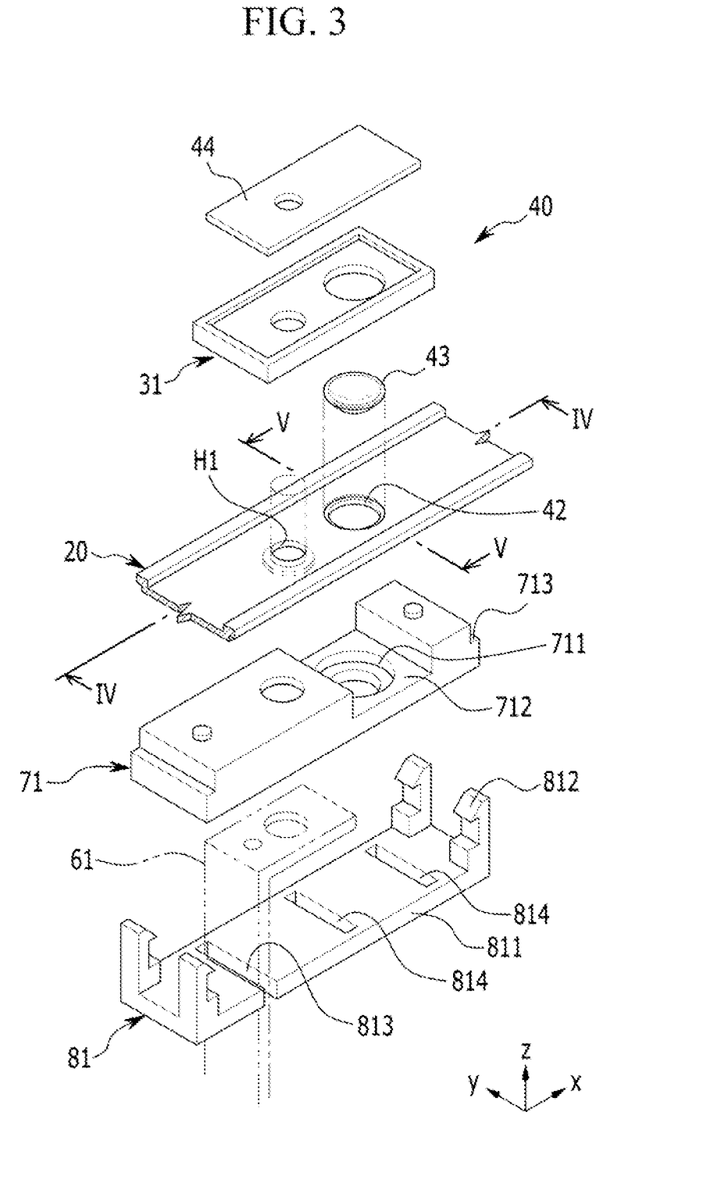
FIG. 3 illustrates an exploded perspective view of an external short-circuit part, a cap plate, an internal insulator, and a retainer of the battery of FIG. 2.
Figure 4:
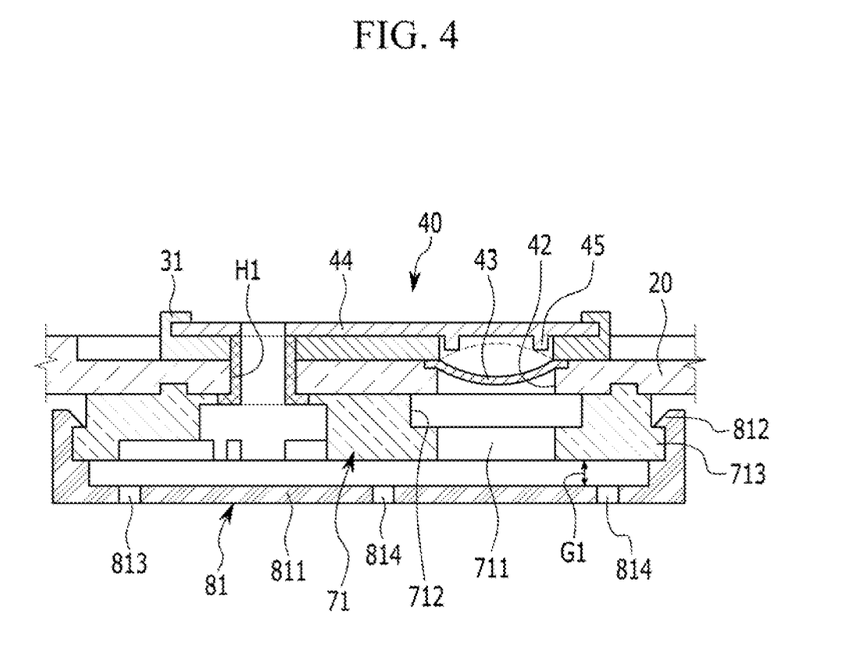
FIG. 4 illustrates a cross-sectional view taken along line IV-IV of FIG. 3.
Figure 5:
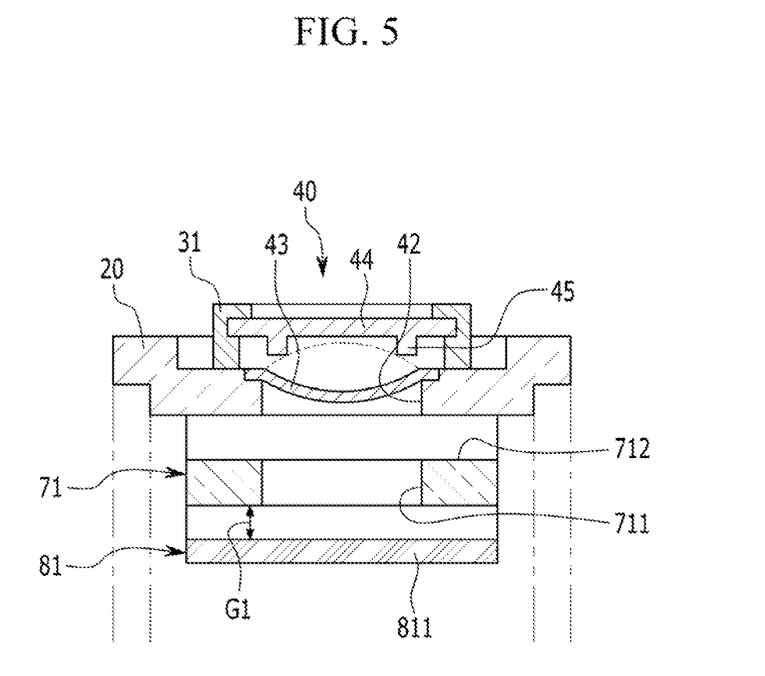
FIG. 5 illustrates a cross-sectional view taken along line V-V of FIG. 3.

FIG. 3 illustrates an exploded perspective view of an external short-circuit part, a cap plate, an internal insulator, and a retainer of the battery of FIG. 2, FIG. 4 illustrates a cross-sectional view taken along line IV-IV of FIG. 3, and FIG. 5 illustrates a cross-sectional view taken along line V-V of FIG. 3.

Referring to FIGS. 2 to 5, the external short-circuit part 40 may include a membrane 43 that closes or covers the short-circuit hole 42 in the cap plate 20 and which may be reversed depending on the internal pressure. The external short-circuit part 40 may include a short-circuit tab 44 that may be short-circuited with the membrane 43.

For example, the short-circuit tab 44 may be electrically connected to the negative electrode terminal 21 and may be at or overlie one side of the membrane 43 so as to be spaced apart from the membrane 43, and may be short-circuited with the membrane 43 when the membrane 43 is reversed due to, e.g., an increase in the internal pressure.

The short-circuit tab 44 may include a short-circuit protrusion 45 that protrudes toward the membrane 43 to be spaced apart from the membrane 43 or to be directly short-circuited to the membrane 43, e.g., depending on the state (inwardly convex or outwardly convex) of the membrane 43. The short-circuit protrusion 45 may be adjacent to the membrane 43, and it may easily contact the membrane 43 when the reversion of the membrane 43 is started or effected.

The cap plate 20 may have the same polarity as the positive electrode, and the short-circuit tab 44 of the external short-circuit part 40 and a rivet terminal 21a of the negative electrode terminal 21 may be installed by interposing an external insulator 31 on the cap plate 20. The external insulator 31 may include holes corresponding to the terminal hole H1 and the short-circuit hole 42, and it may not hinder the installation of the rivet terminal 21a and/or the reversion of the membrane 43.

The internal insulators 71 and 72 may be between the negative and positive electrode lead tabs 61 and 62 and the cap plate 20, respectively, to electrically insulate the negative and positive electrode lead tabs 61 and 62 and the cap plate 20 from each other, respectively. In an implementation, the internal insulators 71 and 72 may have one side coupled with the cap plate 20 and another side enclosing the negative and positive electrode lead tabs 61 and 62, the rivet terminals 21a and 22a, and the flanges 21b and 22b, respectively, to stabilize a connection structure between them.

The retainers 81 and 82 may be coupled with the internal insulators 71 and 72, respectively, to help protect the electrode assembly 10 from external impact, and may be formed of or include an electrically insulating material to electrically insulate the electrode assembly 10 from the negative and positive electrode terminals 21 and 22.

The internal insulator 71 of the negative electrode terminal 21 side may further include a structure covering or aligned with a short-circuit hole 42 of the external short-circuit part 40, e.g., different from a structure of the internal insulator 72 of the positive electrode terminal 72 side. In an implementation, when the membrane 43 of the external short-circuit part 40 is reversed (e.g., outwardly) by the internal pressure of the rechargeable battery 100, the retainer 81 may not to hinder the reversion operation of the membrane 43 by forming a passage for the internal pressure, e.g., by forming a passage for high pressure gas in an interior of the battery 100.

For example, the internal insulator 71 at the negative electrode terminal 21 side of the battery 100 may include a through-hole 711 corresponding to, aligned with, or underlying the short-circuit hole 42. For example, the internal insulator 71 may extend to a side of the short-circuit hole 42, and may cover the negative electrode terminal 21 and the short-circuit hole 42 to help protect the electrode assembly 10 and to insulate the electrode assembly 10 from the negative electrode terminal 21 and the short-circuit hole 42.

With the internal insulator 71 in a state described above, the retainer 81 may be moved in a first direction (a vertical direction in drawings, that is, z axis direction) toward the internal insulator 71 (e.g., from a direction between the internal insulator 71 and the electrode assembly 10) and may then be coupled with the internal insulator 71. For example, the retainer 81 may be coupled with the internal insulator 71 at a bottom side of the internal insulator. Therefore, the internal insulator 71 and the retainer 81 may have a simple coupling structure and may be easily coupled with each other.

In an implementation, the retainer 81 may be coupled with the internal insulator 71 while including a portion that is spaced apart by an interval G1 from the internal insulator 71 in the z axis direction, such that the retainer 81 may shield the through-hole 711 of the internal insulator 71. The interval G1 may facilitate discharge of any electrolyte introduced between the internal insulator 71 and the retainer 81, thereby decreasing an event level at the time of the occurrence of an event of the rechargeable battery 100.

For example, the internal insulator 71 may have a concave groove part 712 therein. The concave groove part 712 may face the short-circuit hole 42. The concave groove part 712 may allow the internal pressure (e.g., pressurized gas) to be smoothly introduced in a y axis direction to the membrane 43 in the short-circuit hole 42, such that the internal pressure may smoothly act on the membrane 43.

In an implementation, the concave groove part 712 may be formed or may extend across an entire width of the internal insulator 71 in a second direction (y axis direction) intersecting with the first direction (z axis direction). Therefore, the internal pressure of the rechargeable battery 100 may more smoothly act on the membrane 43 through the concave groove part 712 between the case 15 in the y axis direction and the internal insulator 71.

In the internal insulator 71, the through-hole 711 may be in the concave groove part 712 toward the short-circuit hole 42. Therefore, the internal pressure of the rechargeable battery 100 (e.g., pressurized gas) may act on the membrane 43 through the through-hole 711 and the concave groove part 712 in the z axis direction.

In an implementation, in order to couple the retainer 81 with the internal insulator 71, the internal insulator 71 may include catching jaws 713 on a side surface thereof. The retainer 81 may include a plate part 811 (that blocks the through-hole 711) and hooks 812 at sides, e.g., both sides, of the plate part 811. The hooks 812 may be coupled with the catching jaws 713. For example, the hooks 812 may be easily coupled with the catching jaws 713 while the retainer 81 is moved in the z axis direction.

The retainer 81 may include an accommodating groove 813 (opened toward one side thereof in the y axis direction) at one side thereof. The accommodating groove 813 may allow the negative electrode lead tab 61 (connecting the negative electrode terminal 21 and the electrode assembly 10 to each other) to penetrate in the z axis direction and may accommodate the negative electrode lead tab 61 penetrating the retainer 81.

In an implementation, the retainer 81 may include at least one outlet 814. The outlet 814 may communicate or connect an internal insulator 71 side of the retainer 81 with an electrode assembly 10 side of the retainer 81 to facilitate the discharging of any electrolyte that may be introduced into the interval GI, the short-circuit hole 42, and/or the membrane 43 side of the external short-circuit part 40 toward the electrode assembly 10 side. Therefore, at the time of the occurrence of an event of the rechargeable battery 100, the event level may be further decreased.

In the case in which the rechargeable battery 100 is normally operated, the membrane 43 may maintain an original form (as shown with a solid line in FIGS. 2 and 4, e.g., inwardly convex) to thereby maintain a spaced apart state from the short-circuit protrusion 45 of the short-circuit tab 44.

In the case in which the internal pressure of the rechargeable battery 100 is raised or increased higher than a predetermined pressure, the membrane 43 may be reversed (shown as a dashed line state in FIGS. 2 and 4, e.g., outwardly convex) to be short-circuited with the short-circuit protrusion 45 of the short-circuit tab 44. For example, the positive electrode terminal 22, the cap plate 20, the membrane 43, the short-circuit tab 44, and the negative electrode terminal 21 may be electrically short-circuited to each other, and a current charged in the electrode assembly 10 may be discharged from the external short-circuit part 40.

Therefore, the retainer 81 may help decrease the event level at the time of the occurrence of the event of the rechargeable battery 100 while helping to protect the electrode assembly 10 from external impact and electrically insulating the electrode assembly 10.

Figure 6:
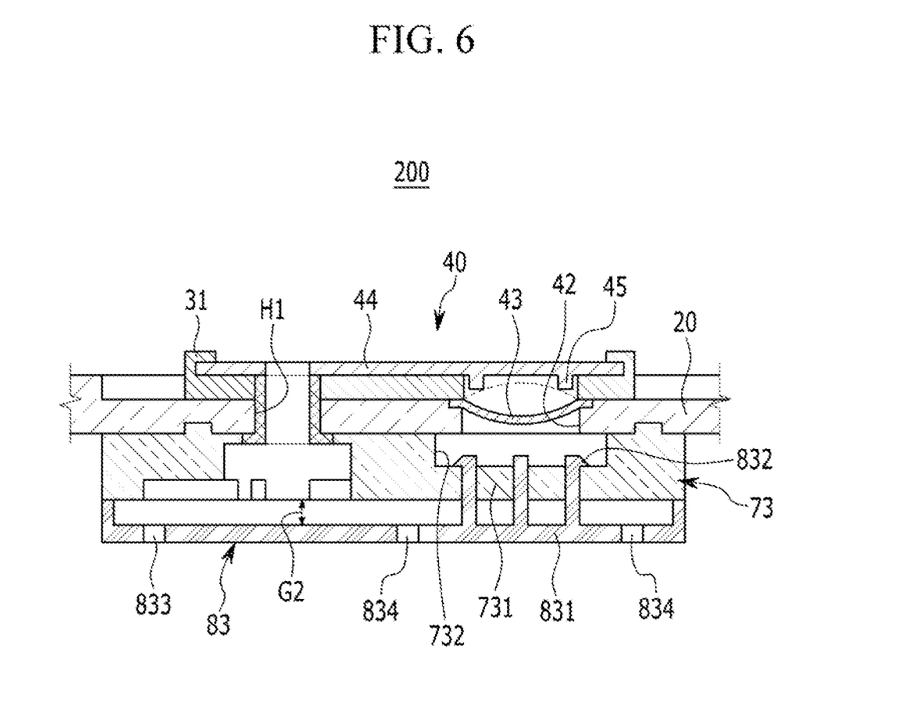
FIG. 6 illustrates a partial cross-sectional view of a rechargeable battery according to an embodiment.

Hereinafter, additional embodiments will be described. A repeated description for the same configurations as those of a first exemplary embodiment and the above described embodiment may be omitted, and configurations different from those of the other embodiments will be described FIG. 6 illustrates a partial cross-sectional view of a rechargeable battery according to an embodiment. Referring to FIG. 6, in a rechargeable battery 200 according to the present embodiment, a retainer 83 may include a plate part 831 (blocking a through-hole 731 of an internal insulator 73) and hooks 832 (on the plate part 831 and facing the through-hole 731). The hooks 832 may be coupled with the through-hole 731, e.g., the retainer 83 may be coupled with the internal insulator 73 at the through hole 731.

For example, the plate part 831 of the retainer 83 may be disposed so as to maintain a space or an interval G2 below an internal insulator 73, and the hooks 832 may be inserted into the through-hole 731 and may catch a concave groove part 732. For example, the internal insulator 73 may not include the catching jaws 713 of the internal insulator 71 of the above-described embodiment.

Therefore, the internal insulator 73 and the retainer 83 may have a simple coupling structure and may be easily coupled with each other. In addition, the interval G2 may easily induce or may facilitate the discharge of any electrolyte introduced between the internal insulator 73 and the retainer 83 (e.g., in the space or interval G2), thereby helping to decrease an event level at the time of the occurrence of an event of the rechargeable battery 200.

In an implementation, the retainer 83 may include at least one outlet 834. The outlet 834 may communicate or connect an internal insulator 73 side of the retainer 83 and an electrode assembly 10 side of the retainer 83 to facilitate the discharge of any electrolyte introduced into the interval G2, the short-circuit hole 42, and/or the membrane 43 of the external short-circuit part 40 toward the electrode assembly 10 side. Therefore, at the time of the occurrence of an event of the rechargeable battery 200, the event level may be further decreased.

Figure 7:
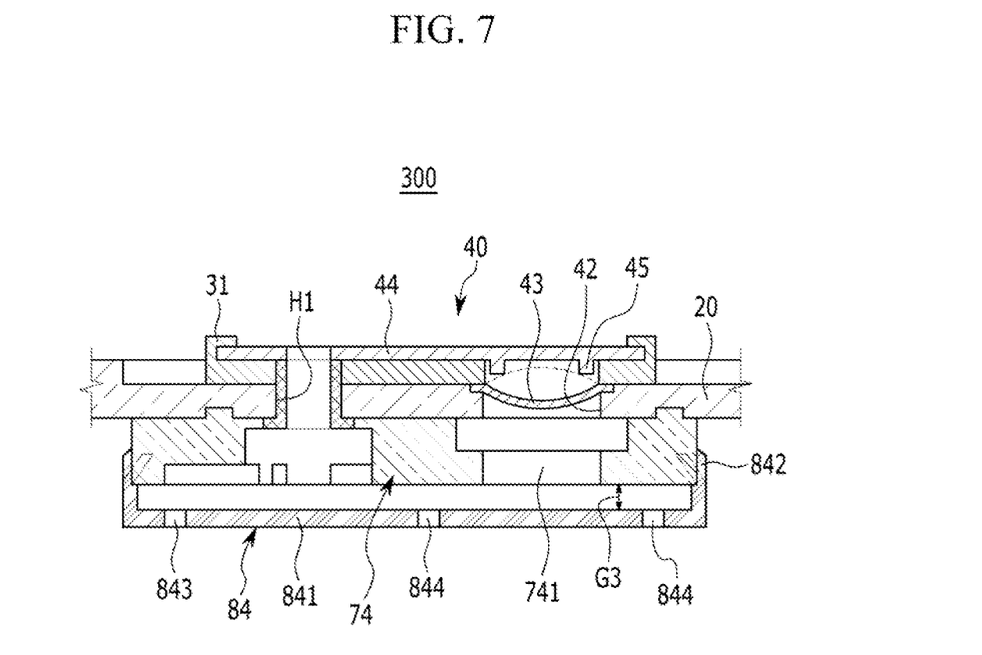
FIG. 7 illustrates a partial cross-sectional view of a rechargeable battery according to an embodiment.

FIG. 7 illustrates a partial cross-sectional view of a rechargeable battery according to an embodiment. Referring to FIG. 7, in a rechargeable battery 300 according to the present embodiment, a retainer 84 may include a plate part 841 (blocking a through-hole 741) and elastic protrusions 842 (at sides, e.g., both sides, of the plate part 841). The elastic protrusions 842 may be elastically coupled with side surfaces of the internal insulator 74.

For example, the plate part 841 of the retainer 84 may be disposed so as to maintain a space or an interval G3 below the internal insulator 74, and the elastic protrusions 842 may be elastically coupled with side surfaces of the internal insulator 74. For example, the internal insulator 74 may not include the catching jaws 713 of the internal insulator 71 of the above-described embodiment.

Therefore, the internal insulator 74 and the retainer 84 may have a more simple coupling structure and may be more easily coupled to each other. In addition, the space or interval G3 may facilitate the discharge of any electrolyte introduced between the internal insulator 74 and the retainer 84, thereby helping to decrease an event level at the time of the occurrence of an event of the rechargeable battery 300.

In an implementation, the retainer 84 may include at least one outlet 844. The outlet 844 may communicate or connect the internal insulator 74 side of the retainer 84 and the electrode assembly 10 side of the retainer 84 to facilitate the discharge of any electrolyte introduced into the interval G3, the short-circuit hole 42, and/or the membrane 43 side of the external short-circuit part 40 toward the electrode assembly 10 side. Therefore, at the time of the occurrence of an event of the rechargeable battery 300, the event level may be further decreased.

Figure 8:
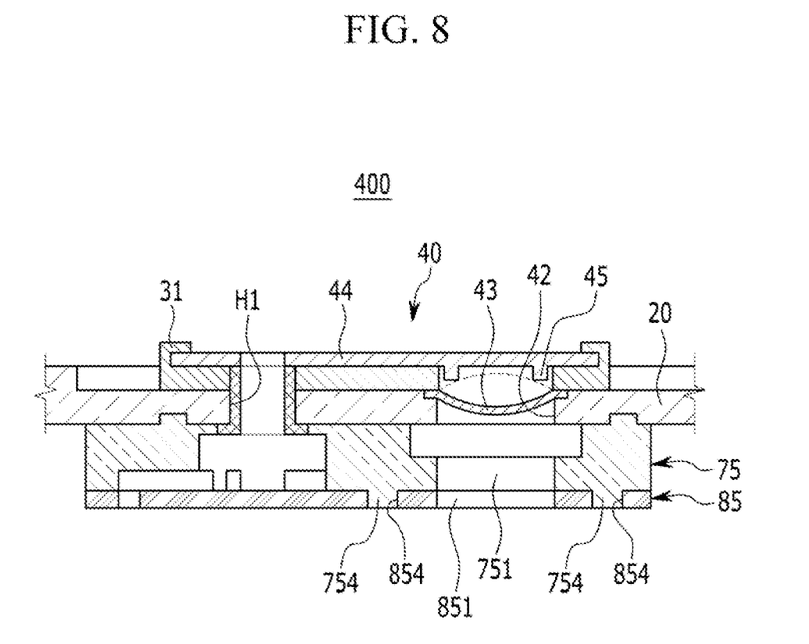
FIG. 8 illustrates a partial cross-sectional view of a rechargeable battery according to an embodiment.

FIG. 8 illustrates a partial cross-sectional view of a rechargeable battery according to an embodiment. Referring to FIG. 8, in a rechargeable battery 400 according to the present, an internal insulator 75 may include a coupling protrusion 754 (that protrudes toward the electrode assembly 10) and a retainer 85 may include a coupling hole 854 (that is coupled to the coupling protrusion 754).

The retainer 85 may be closely coupled with the internal insulator 75, and may further include a corresponding through-hole 851 connected to or continuous with the through-hole 751. For example, the internal insulator 75 may not include the catching jaws 713 of the internal insulator 71 of the above-described embodiment, and the retainer 85 may not include the outlets 814, 834, and 844 of the retainers 81, 83, and 84 according to the above-described embodiments.

Therefore, the internal insulator 74 and the retainer 84 may have a more simple coupling structure and may be more easily coupled to each other. In addition, the corresponding through-hole 851 may facilitate discharge of any electrolyte introduced into the internal insulator 74, thereby decreasing an event level at the time of the occurrence of an event of the rechargeable battery 400.

By way of summation and review, a rechargeable battery may include an electrode assembly (including a positive electrode and a negative electrode on surfaces of a separator), a case accommodating the electrode assembly therein, a cap plate closing an opening of the case, and a negative electrode terminal and a positive electrode terminal penetrating through the cap plate and being electrically connected to the electrode assembly.

A rechargeable battery may include an external short-circuit part that is short-circuitable between the cap plate (having the same polarity as the positive electrode terminal) and the negative electrode terminal. The external short-circuit part may include a membrane (that closes or covers a short-circuit hole of the cap plate) and a short-circuit tab (that is electrically connected to the negative electrode terminal and at one side of the membrane so as to be spaced apart from the membrane).

When an internal pressure of the rechargeable battery arrives at a predetermined pressure, the membrane may be reversed (e.g., from an inwardly convex state to an outwardly convex state) and may be operated such that the short-circuit tab may be short-circuited, thereby discharging a current (from the electrode assembly) to the outside of the electrode assembly.

In addition, a rechargeable battery may include an internal insulator (that supports the negative electrode terminal with an insulating structure in the cap plate) and a retainer (coupled with the internal insulator). When the membrane is reversed by the internal pressure, the retainer may protect the electrode assembly from external impact, may electrically insulate the electrode assembly, and may form a passage for the internal pressure (e.g., gas) without hindering reversion operation of the membrane.

For example, the retainer may be coupled with the internal insulator in a complex structure, and it may be difficult to assemble the internal insulator with the retainer. When an electrolyte is introduced into the retainer, it may be difficult for the electrolyte to exit the retainer. Therefore, upon occurrence of an event such as ignition or explosion in the rechargeable battery, an event level (e.g., indicating a degree of seriousness of the event) may be increased.

The embodiments may provide a rechargeable battery having a simplified coupling structure of an internal insulator and a retainer.

The embodiments may provide a rechargeable battery having advantages of easily coupling an internal insulator and a retainer and easily discharging an electrolyte from between the internal insulator and the retainer.

According to an embodiment, the retainer may be coupled with the internal insulator, may be between the internal insulator and the electrode assembly, may be moved in direction toward the internal insulator (e.g., during coupling), and the coupling structure of the internal insulator and the retainer may be simplified. Therefore, according to an embodiment, the internal insulator and the retainer may be easily coupled to each other.

In addition, the internal insulator may include the through-hole corresponding to the short-circuit hole, the retainer may shield the through-hole in the state in which it is spaced apart from the internal insulator, and any introduced electrolyte may be easily discharged in the spaced interval between the internal insulator and the retainer. Therefore, at the time of the occurrence of the event of the rechargeable battery, the event level may be decreased.

In addition, the retainer may include the outlet to connect an internal insulator side and an electrode assembly side with each other, and any electrolyte introduced between the internal insulator and the retainer may be easily discharged to the outlet. Therefore, at the time of the occurrence of the event of the rechargeable battery, the event level may be further decreased.

The embodiments may provide a rechargeable battery having an external short-circuit part.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

<Description of symbols>

| | |
|---|---|
| 10: electrode assembly | 11: negative electrode |
| 11a, 12a: coating part | 11b, 12b: uncoated part |
| 12: positive electrode | 13: separator |
| 15: case | 20: cap plate |
| 21: first electrode (negative electrode) terminal | |
| 21a, 22a: rivet terminal | |
| 21b, 22b: flange | 21c, 22c: plate terminal |
| 22: second electrode (positive electrode) terminal | |
| 36, 37: negative, positive electrode gasket | |
| 32: top plate | 40: external short-circuit part |
| 42: short-circuit hole | 43: membrane |
| 44: short-circuit tab | 45: short-circuit protrusion |
| 71, 72, 73, 74, 75: internal insulator retainer | |
| 100, 200, 300, 400: rechargeable battery | |
| 201: electrolyte injection opening | |
| 202: vent hole | 203: sealing closure |
| 204: vent plate | 205: notch |
| 711, 731, 741, 751: through-hole | 712, 732: concave groove part |
| 713: catching jaw | 754: coupling protrusion |
| 811, 831, 841: plate part  812, 832: hook | |
| 813: accommodating groove | 814, 834: outlet |
| 842: elastic protrusion | 851: corresponding through-hole |
| 854: coupling hole | G1, G2, G3: interval |
| H1, H2: terminal hole | |

What is claimed is:

1. A rechargeable battery, comprising:
   a case including an electrode assembly therein;
   a cap plate on the case, the cap plate including a short-circuit hole therein;
   an internal insulator at an inner side of the cap plate, the internal insulator covering the short-circuit hole;
   a first electrode terminal and a second electrode terminal that penetrate through the internal insulator and the cap plate and that are electrically connected to the electrode assembly;
   an external short-circuit part on the cap plate, the external short-circuit part including:
      a membrane electrically connected to the short-circuit hole of the cap plate, the cap plate being electrically connected to the second electrode terminal, and
      a short-circuit tab electrically connected to the first electrode terminal, the external short-circuit part selectively spacing or short-circuiting the first electrode terminal and the second electrode terminal; and
   a retainer coupled with the internal insulator, the retainer being between the internal insulator and the electrode assembly.

2. The rechargeable battery as claimed in claim 1, wherein:
   the internal insulator includes a through-hole underlying the short-circuit hole, and
   the retainer includes a portion that is spaced apart from the internal insulator in a first direction and that shields the through-hole.

3. The rechargeable battery as claimed in claim 2, wherein:
   the internal insulator includes a concave groove part facing the short-circuit hole, and
   the concave groove part extends across an entire width of the internal insulator in a second direction intersecting with the first direction.

4. The rechargeable battery as claimed in claim 3, wherein the retainer includes:
   a plate part blocking the through-hole, and
   elastic protrusions at sides of the plate part, the elastic protrusions being elastically coupled with side surfaces of the internal insulator.

5. The rechargeable battery as claimed in claim 3, wherein the through-hole of the internal insulator is in the concave groove part facing the short-circuit hole.

6. The rechargeable battery as claimed in claim 5, wherein:
the internal insulator includes catching jaws on side surfaces thereof, and
the retainer includes:
a plate part that blocks the through-hole, and
hooks at sides of the plate part, the hooks being coupled with the catching jaws.

7. The rechargeable battery as claimed in claim 6, wherein the retainer includes an accommodating groove including an opening that is open in the second direction, the accommodating groove accommodating a lead tab therein, the lead tab connecting the first electrode terminal and the electrode assembly to each other.

8. The rechargeable battery as claimed in claim 6, wherein the retainer includes an outlet that connects an internal insulator side of the retainer and an electrode assembly side of the retainer, the outlet discharging any electrolyte introduced into the external short-circuit part.

9. The rechargeable battery as claimed in claim 8, wherein the retainer includes:
the plate part blocking the through-hole, and
hooks on a region of the plate part that faces the through-hole of the internal insulator, the hooks being coupled with the through-hole.

10. The rechargeable battery as claimed in claim 1, wherein:
the internal insulator includes a coupling protrusion that protrudes toward the electrode assembly, and
the retainer includes a coupling hole coupled with the coupling protrusion.

11. The rechargeable battery as claimed in claim 10, wherein the retainer further includes a corresponding through-hole closely coupled to the internal insulator and connected to the through-hole.

* * * * *